United States Patent
Lin

(10) Patent No.: US 9,160,992 B2
(45) Date of Patent: Oct. 13, 2015

(54) PROJECTION APPARATUS HAVING MEMS MIRROR WITH PLURAL PROJECTION PATHS

(71) Applicant: LITE-ON IT CORPORATION, Taipei (TW)

(72) Inventor: Wei-Chih Lin, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 268 days.

(21) Appl. No.: 13/922,257

(22) Filed: Jun. 20, 2013

(65) Prior Publication Data

US 2014/0218698 A1    Aug. 7, 2014

(30) Foreign Application Priority Data

Feb. 7, 2013  (CN) .............................. 20130050666

(51) Int. Cl.
G03B 21/20 (2006.01)
H04N 9/31 (2006.01)
G03B 21/26 (2006.01)

(52) U.S. Cl.
CPC .......... *H04N 9/3129* (2013.01); *G03B 21/2086* (2013.01); *G03B 21/26* (2013.01); *G03B 21/2013* (2013.01); *G03B 21/2033* (2013.01); *G03B 21/2053* (2013.01); *H04N 9/3135* (2013.01); *H04N 9/3164* (2013.01)

(58) Field of Classification Search
CPC .... G03B 21/00; G03B 21/20; G03B 21/2033; G03B 21/2046; G03B 21/2086; G03B 21/28; G03B 21/2053; G03B 21/26; H04N 9/31; H04N 9/3129; H04N 9/3135; H04N 9/3161; H04N 9/3164
See application file for complete search history.

(56) References Cited

U.S. PATENT DOCUMENTS

| 7,163,294 B2* | 1/2007 | Nambudiri et al. ............. 353/31 |
| 7,255,445 B2* | 8/2007 | Kojima ............................ 353/31 |
| 7,364,309 B2* | 4/2008 | Sugawara et al. ............... 353/85 |
| 7,384,159 B2* | 6/2008 | Takeda ............................ 353/94 |
| 7,475,993 B2* | 1/2009 | Takeda ............................ 353/31 |
| 8,506,090 B2* | 8/2013 | Nicoli et al. .................... 353/69 |
| 2005/0140930 A1* | 6/2005 | Dvorkis et al. ................. 353/31 |
| 2010/0020291 A1* | 1/2010 | Kasazumi et al. ............. 353/38 |

* cited by examiner

*Primary Examiner* — Jori S Reilly-Diakun
(74) *Attorney, Agent, or Firm* — Jianq Chyun IP Office

(57) ABSTRACT

A projection apparatus includes a light source module and a micro-electro-mechanical-system (MEMS) mirror. The light source module outputs a plurality of illumination beams having different transmission paths. The MEMS mirror is disposed on the transmission paths of the illumination beams. Each illumination beam propagates to the MEMS mirror respectively, and the illumination beams are respectively reflected by the MEMS mirror to project on a plurality of positions within an imaging region, wherein the transmission paths of the illumination beams transmitted from the light source to the MEMS mirror are not intersected with the imaging region.

9 Claims, 9 Drawing Sheets

PROJECTION APPARATUS HAVING MEMS MIRROR WITH PLURAL PROJECTION PATHS

CROSS-REFERENCE TO RELATED APPLICATION

This application claims the priority benefit of China application serial no. 201310050666.3, filed on Feb. 7, 2013. The entirety of the above-mentioned patent application is hereby incorporated by reference herein and made a part of this specification.

BACKGROUND

1. Field of the Invention

The present invention is directed to a projection apparatus and more particularly to a projection apparatus capable of projecting an image having a plurality of sub imaging regions arranged in an array.

2. Description of Related Art

In recent years, due to a combination with mobile projection demands, a pico projection apparatus may be further widely applied in various fields, such as home, business, traveling, games, mobility and so on and has become one of the most important technologies to be developed in the projection apparatus field.

Generally, a pico projection apparatus is referred to a portable projector which is weighted under 1 kilogram. The projection technologies that are widely applied to pico projection apparatuses include the LCD projection technology, the liquid crystal on silicon (LCoS) projection technology, the digital light processing (DLP) projection technology and the laser scanner projection technology. Therein, the laser scanner projection technology has advantages, such as high luminance, wide color gamut, focus-free and long lifespan due to the usage of a laser source. On the other hand, the laser scanner projection technology applies a micro-electro-mechanical system (MEMS) to fabricate related mirror elements and systems and thus, also has advantages, such as being small-volume, light-weight, having low power consumption and stable functionality, etc. Moreover, a laser scanner projection apparatus may be embedded into a mobile device due to being small-volume and become more convenient in carrying.

However, the laser light source adopted by the laser scanner projection technology has characteristics, such as having high collimation, small divergence angles, etc., and thus, when the laser light source used by the laser scanner projection technology is directly incident on a human eye, a permanent damage will be caused on a retina. Accordingly, every country in the world sets up safety criteria on the usage of the laser light source. For instance, according to the laser safety criteria "ICE 60825-1 2000" set up by the International Electrotechnical Commission (IEC), it is regulated that an output power of a continuous-wave visible laser beam is not allowed to be greater than 1 milliwatt (MW). However, if doing so, an image luminance capable of being outputted by the laser scanner projection technology is limited.

Moreover, an image resolution which may be achieved by the laser scanner projection technology is also decided by a size and a rotation speed of an MEMS mirror. Typically, when the MEMS mirror has a greater size or a faster rotation speed, the image resolution will be higher. However, the greater size of the MEMS mirror leads to more limitations to the rotation speed, while the smaller size of the MEMS mirror leads to higher cost. As a result, the rotation speed and the size of the MEMS lens are not easily improved simultaneously, which also construct limitations to an image resolution that can be achieved by the laser scanner projection technology.

Accordingly, in order to meet requirements on both mobile projection and quality of projected images, how to overcome technological bottlenecks in the laser scanner projection technology is indeed one of the important subjects for research and design staffs to pay attention to.

SUMMARY

The present invention provides a projection apparatus capable of projecting an image having good resolution.

The projection apparatus provided by the present invention includes a light source module and a Micro-electro-mechanical-system (MEMS) mirror. The light source module outputs a plurality of illumination beams having different transmission paths. The MEMS mirror is disposed on the transmission paths of the illumination beams. Each of the illumination beams propagates to the MEMS mirror and is reflected by the MEMS mirror to project on a plurality of positions within an imaging region. The transmission paths of the illumination beams transmitted from the light source to the MEMS mirror are not intersected with the imaging region.

In an embodiment of the present invention, the light source module outputs two illumination beams having different transmission paths.

In an embodiment of the present invention, the light source module includes a plurality of coherence light sources and a plurality of optical elements. The coherence light sources are configured to provide a plurality of light beams, and each of the optical elements is disposed on a transmission path of one of the light beams.

In an embodiment of the present invention, each of the coherence light sources includes a laser diode.

In an embodiment of the present invention, the optical elements include lenses and/or reflectors.

In an embodiment of the present invention, the MEMS mirror performs two-dimensional rotations with a first direction and a second direction as rotation axes.

In an embodiment of the present invention, the first direction is substantially perpendicular to the second direction.

In an embodiment of the present invention, the imaging region is divided into a plurality of sub imaging regions arranged in an array. Each of the illumination beams propagates to the MEMS mirror and is reflected by the MEMS mirror to one of the sub imaging regions to project a display dot.

In an embodiment of the present invention, each of the display dots located in different positions forms an overlapping projection region. A ratio of an area of the overlapping projection region to an area of the imaging region is C %, an image luminance of the imaging region is A lumen, an acceptable luminance of the illumination beam directly incident on a human eye under a safety limit is X lumen, and C %, A and X satisfy an expression as follows:

$$X \leq A \leq X + X \cdot (1 - C\%).$$

In an embodiment of the present invention, an angle for the MEMS mirror to perform the rotation with the first direction as the rotation axis is θ, an included angle between each of the illumination beams reflected by the MEMS mirror is γ, and θ and γ satisfy an expression as follows:

$$0.0018° \leq \gamma \leq 2\theta.$$

In an embodiment of the present invention, θ is between 5° and 30°.

To sum up, the projection apparatus of the present invention utilizes a plurality of illumination beams operated with a single MEMS mirror. Users can view a complete image that is constituted by a plurality of parts, and each part of the complete image is respectively provided through the scanning of one of the illumination beams incident to the MEMS mirror.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
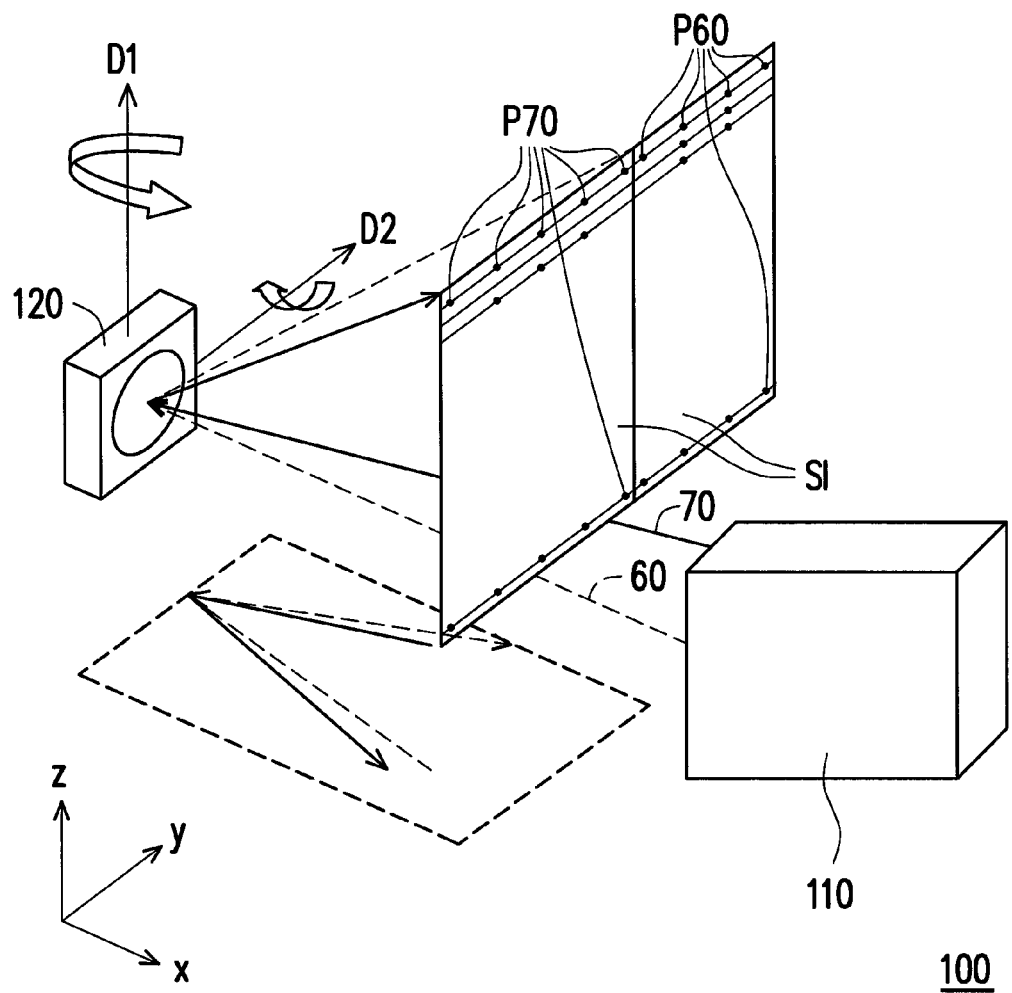
FIG. 1 schematically illustrates a perspective view of a projection apparatus according to an embodiment of the present invention.
Figure 2A:
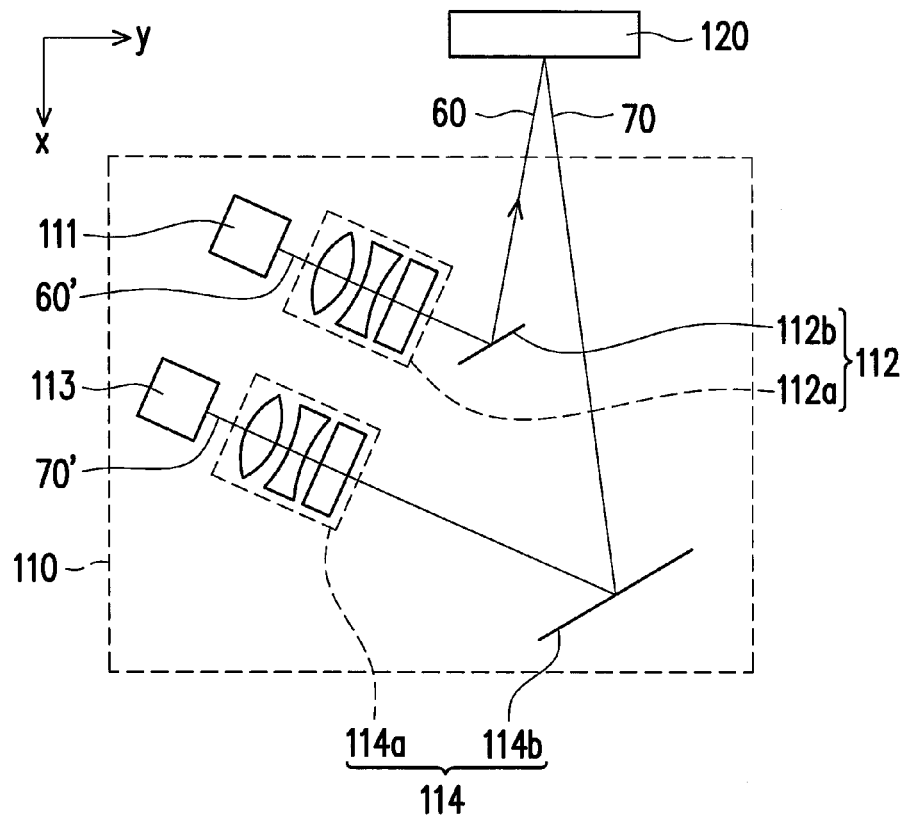
FIG. 2A schematically illustrates a top view of the light source module depicted in FIG. 1.
Figure 2B:
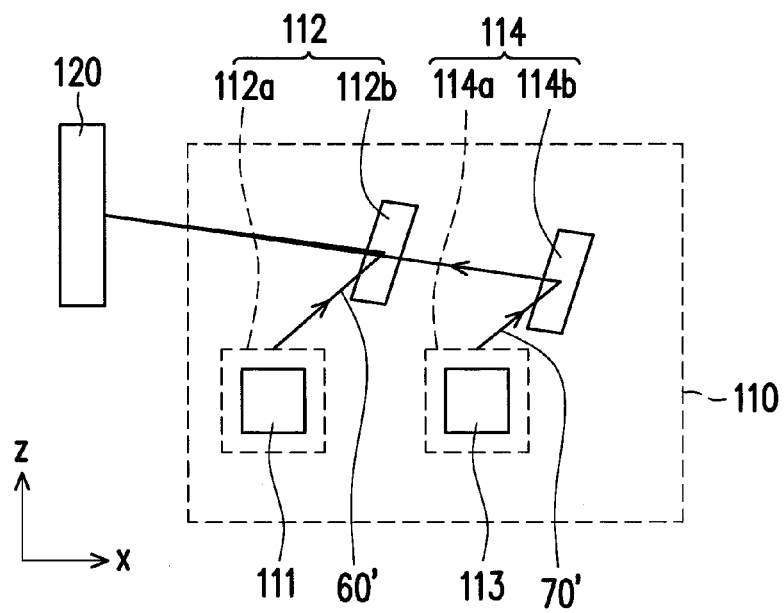
FIG. 2B schematically illustrates a side view of the light source module depicted in FIG. 1.
Figure 3A:
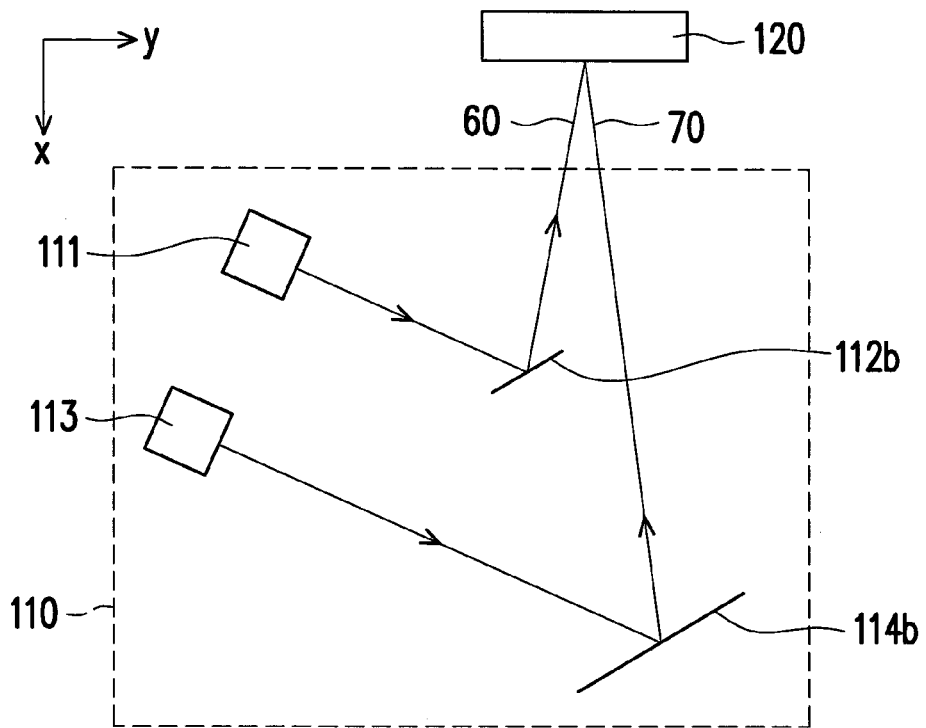
FIG. 3A schematically illustrates another top view of the light source module depicted in FIG. 1.
Figure 3B:
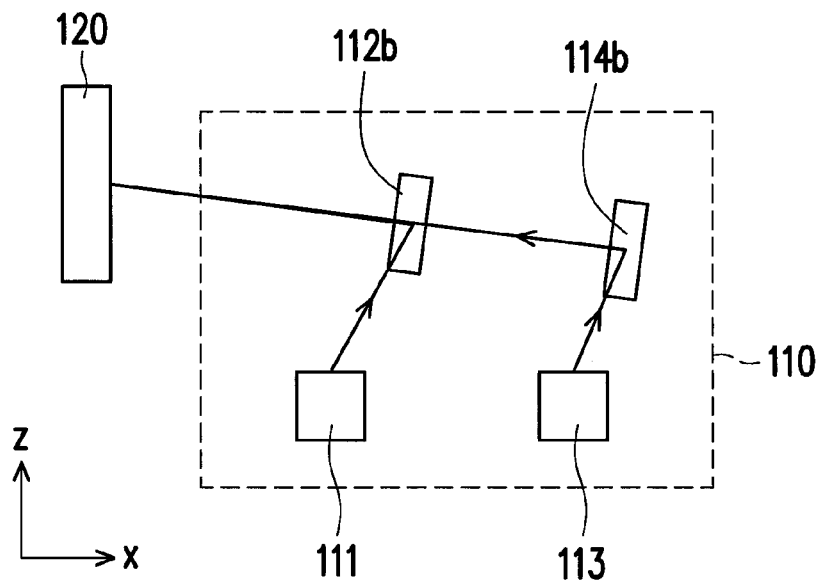
FIG. 3B schematically illustrates another side view of the light source module depicted in FIG. 1.
Figure 4A:
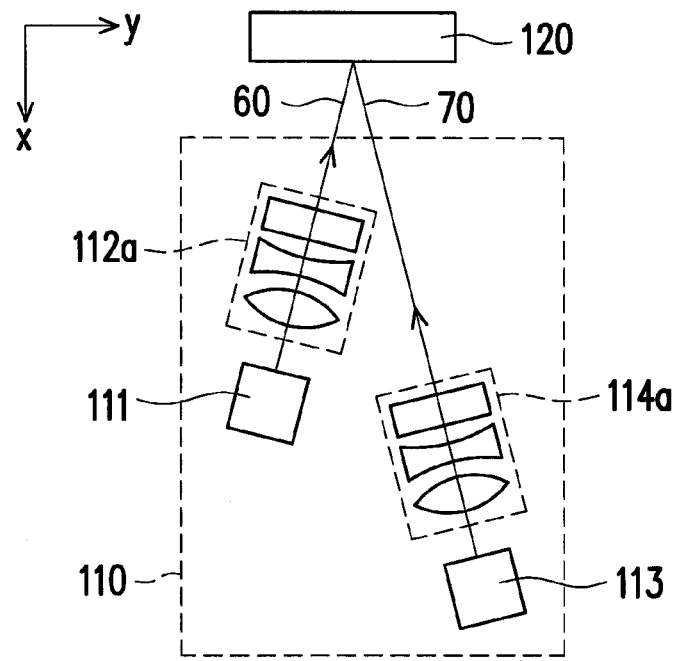
FIG. 4A schematically illustrates still another top view of the light source module depicted in FIG. 1.
Figure 4B:
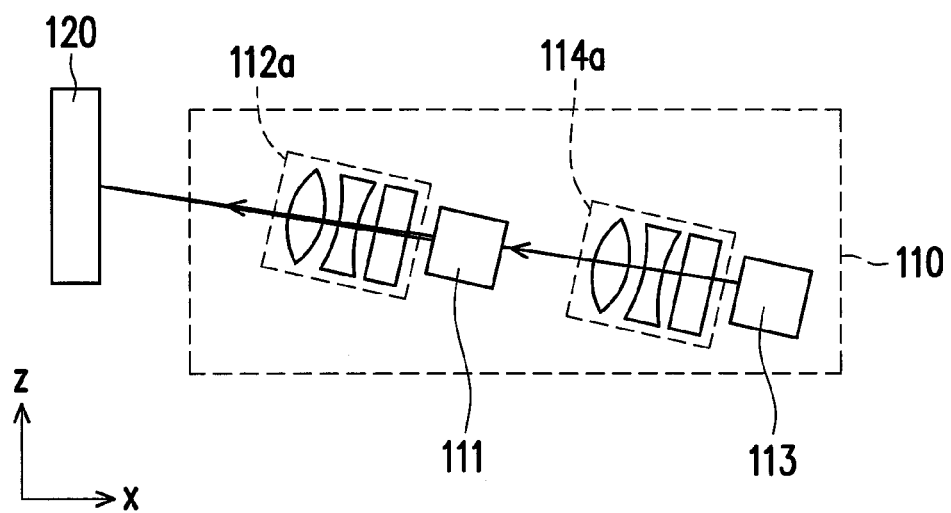
FIG. 4B schematically illustrates still another side view of the light source module depicted in FIG. 1.

FIG. 1 schematically illustrates a perspective view of a projection apparatus according to an embodiment of the present invention. FIG. 2A, FIG. 3A and FIG. 4A schematically illustrate different top views of the light source module depicted in FIG. 1. FIG. 2B, FIG. 3B and FIG. 4B schematically illustrate different side views of the light source module depicted in FIG. 1. Referring to FIG. 1, a projection apparatus 100 of the present embodiment includes a light source module 110 and a Micro-electro-mechanical-system (MEMS) mirror 120. The light source module 110 is capable of outputting a plurality of illumination beams 60 and 70 having different transmission paths.

Referring to FIG. 2A through FIG. 2B, in the present embodiment, the light source module 110 includes a plurality of coherence light sources 111 and 113 for providing a plurality of light beams 60' and 70'. To be specific, the coherence light sources 111 and 113 may correspondingly output trichromatic light beams having different colors and strength according to clock signals so as to project an image in an imaging region SI. For example, in the present embodiment, the coherence light sources 111 and 113 may be laser diodes, but the present invention is not limited thereto. In other alternative embodiments, the coherence light sources 111 and 113 may be other types of coherence light sources.

On other hand, in the present embodiment, the light source module 110 may also include a plurality of optical elements 112 and 114 which are respectively disposed on transmission paths of the light beams 60' and 70'. Besides, the optical elements 112 and 114 may respectively include lenses, each labeled as 112a and 114a and reflectors, each labeled as 112b and 114b. Through adjusting angles of the two reflectors 112b and 114b, the reflected light beams 60' and 70' are respectively formed as the illumination beams 60 and 70 incident to the MEMS mirror 120 with different incident angles so as to be reflected to project on different positions of the imaging region SI. It should be noticed that though the optical elements 112 and 114 respectively include an assembly of one of the lenses 112a and 114a and one of the reflectors 112b and 114b, the present invention is not limited thereto. In other alternative embodiments, the optical elements 112 and 114 may be any assembly composed of any type of lenses and reflectors or only include the lenses 112a and 114a (as shown in FIG. 4A through FIG. 4B) or only include the reflectors 112b and 114b (as shown in FIG. 3A through FIG. 3B).

As illustrated in FIG. 1, in the present embodiment, the MEMS mirror 120 of the projection apparatus 100 is disposed on the transmission paths of the illumination beams 60 and 70. After being emitted from the light source module 110, the illumination beams 60 and 70 respectively propagate to the MEMS mirror 120. Then, the illumination beams 60 and 70 are respectively reflected by the MEMS mirror 120 to project within the imaging region SI to form display dots P60 and P70. The display dots P60 and P70 are located on different positions of the imaging region SI. The transmission paths of the illumination beams 60 and 70 transmitted from the light source module 110 to the MEMS mirror 120 are not intersected with the imaging region SI, and thus, a situation where the illumination beams 60 and 70 are shielded by the optical elements or an imaging screen would not occur.

Additionally, in the present embodiment, since the MEMS mirror 120 may perform two-dimensional rotations, the display dots P60 and P70 projected within the imaging region SI are successively projected on different positions within the imaging region SI while the MEMS mirror 120 performs the two-dimensional rotations. The operation mechanism of the MEMS mirror 120 and how the display dots P60 and P70 shift or scan will be described with reference to FIG. 5A through FIG. 5C hereinafter.

Figure 5A:
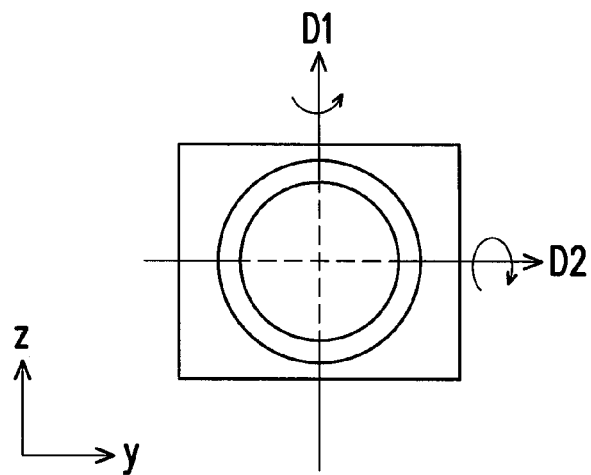
FIG. 5A schematically illustrates a front view of the Micro-electro-mechanical-system (MEMS) mirror depicted in FIG. 1.
Figure 5B:
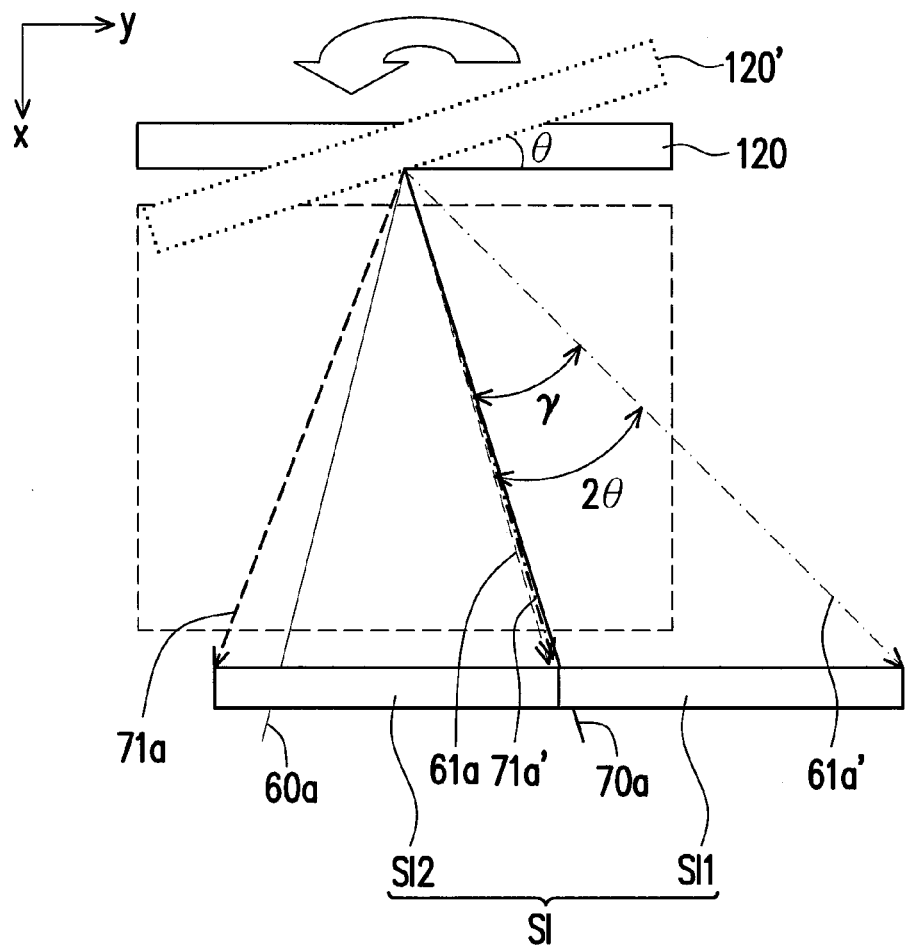
FIG. 5B schematically illustrates a top view of the MEMS mirror depicted in FIG. 1.
Figure 5C:
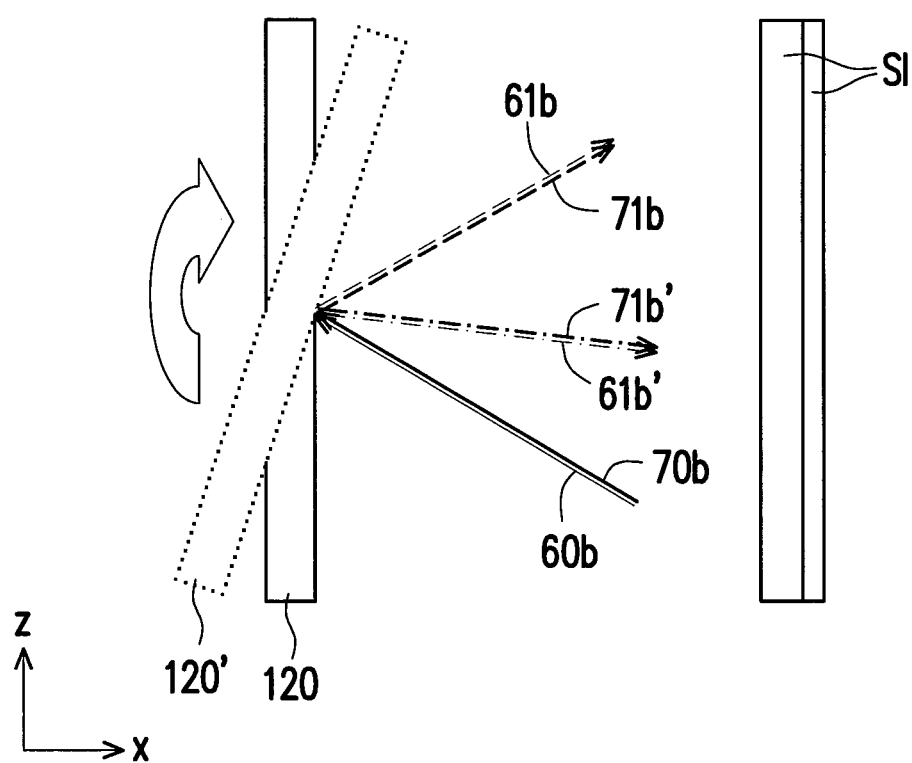
FIG. 5C schematically illustrates a side view of the MEMS mirror depicted in FIG. 1.

FIG. 5A schematically illustrates a front view of illustrating the MEMS mirror depicted in FIG. 1. FIG. 5B schematically illustrates a top view of the MEMS mirror depicted in FIG. 1. FIG. 5C schematically illustrates a side view of the MEMS mirror depicted in FIG. 1. Referring to FIG. 5A through FIG. 5C, in the present embodiment, the MEMS mirror 120 may perform the two-dimensional rotations with a first direction D1 and a second direction D2 as the rotation axes. The first direction D1 is, for example, a Z direction parallel to a perpendicular direction, and the second direction D2 is, for example, a Y direction parallel to a horizontal direction. In other words, the first direction D1 is substantially perpendicular to the second direction D2. Referring to FIG. 5B, when the MEMS mirror 120 rotates angle θ with the first direction D1 as the rotation axis, the incident angles for beam components 60a and 70a of the illumination beams 60 and 70 on an X-Y plane to the MEMS mirror 120 are varied, accordingly. In the meantime, transmission paths for reflecting the beam components 61a and 71a also vary and rotates an angle 2θ based on an optical lever principle to form new reflected beam components 61a' and 71a'. As such, when the MEMS mirror 120 rotates with the first direction D1 as the rotation axis, a scenario where the display dots P60 and P70 shifts or scans horizontally within the imaging region SI occurs. Likewise, when the MEMS mirror 120 rotates with the second direction D2 as the rotation axis, a scenario where the display dots P60 and P70 shifts or scans perpendicularly within the imaging region SI may occur with changes of the transmission paths of the reflected beam components 61b, 71b, 61b' and 71b'. How the display dots P60 and P70 shift or scan within the imaging region SI will be further described with reference to FIG. 5D hereinafter.

Figures 5D, 5E:
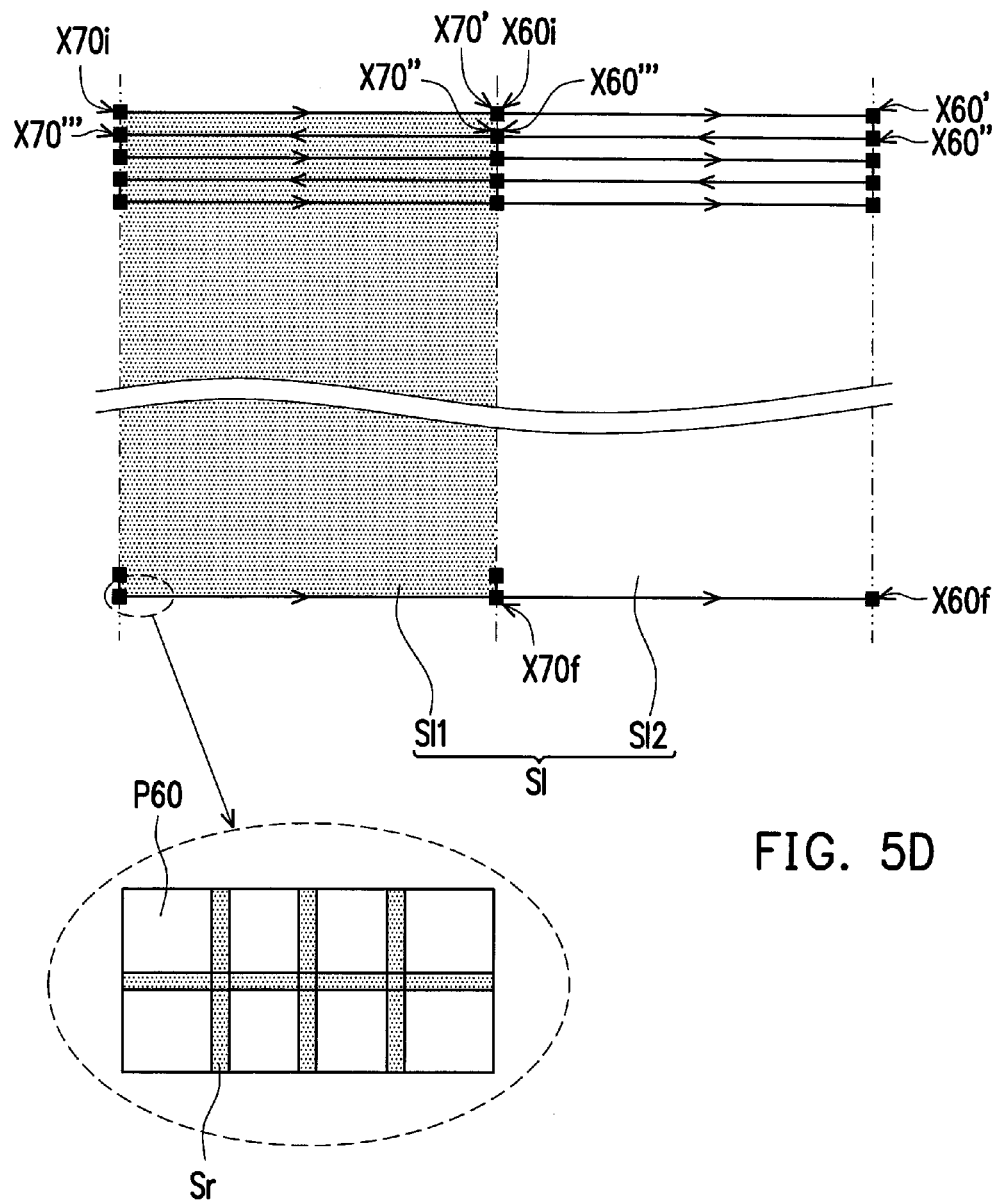
FIG. 5D schematically illustrates a front view of the imaging region depicted in FIG. 1.
FIG. 5E schematically illustrates a partially enlarged view of the imaging region depicted in FIG. 5D.

FIG. 5D schematically illustrates a front view of the imaging region depicted in FIG. 1. Referring to FIG. 5D, typically, a speed for the MEMS mirror 120 to rotate with the first direction D1 as the rotation axis is faster than a speed to rotate with the second direction D2 as the rotation axis. In other words, a horizontal rotation speed of the MEMS mirror 120 is faster, while a perpendicular rotation speed is slower. In the present embodiment, the left and the right half parts of the imaging region SI is scanned from top to bottom by the illumination beams 60 and 70. For instance, the imaging region SI may be further divided into two horizontally arranged sub imaging regions SI1 and SI2. Each of the illumination beams 60 and 70 propagates to the MEMS mirror 120 and is reflected by the MEMS mirror 120 to project on a plurality of positions within the sub imaging regions SI1 and SI2.

For instance, when the MEMS mirror 120 rotates with the first direction D1 as the rotation axis counterclockwise (as shown in FIG. 5B), the display dot P60 projected by the illumination beam 60 within the sub imaging region SI2 horizontally shifts from a position X60i to a position X60', and display dot P70 projected by the illumination beam 70 within the sub imaging region SI2 horizontally shifts from a position X70i to a position X70'. When the display dot P60 shifts to the position X60', and the display dot P70 shifts to the position X70', the MEMS mirror 120 rotates with the second direction D2 as the rotation axis, such that the display dot P60 perpendicularly shifts from the position X60' to a position X60'' and the display dot P70 perpendicularly shifts from the position X70' to a position X70''. Then, the MEMS mirror 120 continues to clockwise rotates with the first direction D1 as the rotation axis, and at this time, the display dot P60 projected by the illumination beam 60 within the sub imaging regions SI1 horizontally shifts from the X60'' to a position X60''', and the display dot P70 projected by the illumination beam 70 within the sub imaging regions SI1 horizontally shifts from the position X70'' to a position X70'''. Thereafter, the MEMS mirror 120 continuously repeats the rotations, such that the display dots P60 and P70 respectively shift to positions X60f and X70f along circuitous paths. Accordingly, the projection operation of a single image is completed.

In addition, the coherence light sources 111 and 113 may correspondingly output trichromatic light beams having different colors and different intensity according to clock signals, and thus, display dots P60 and P70 on different positions may respectively have the colors and the intensity as desired. Meanwhile, due to visual persistence, the display dots P60 and P70 projected within the imaging region SI may form an image to be viewed by a viewer. Taking an image having a frame rate of 60 Hz as an example, the projection apparatus 100 has to complete projecting all the display dots P60 and P70 within the imaging region SI once per 1/60 second. In other words, per 1/60 second, the image within the imaging region SI is refreshed once. It should be noticed that the frame rate of the projection apparatus 100 may be determined according to requirements of product design, and the present embodiment does not limit the frame rate to 60 Hz.

FIG. 5E schematically illustrates a partially enlarged view of the imaging region depicted in FIG. 5D. Referring to FIG. 5E, when the display dots P60 and P70 are on different positions within the imaging region SI, an overlapping projection region Sr may be formed. Thus, if a ratio of an area of the overlapping projection region Sr to an area of the imaging region SI is C %, an image luminance of the imaging region SI is A lumen, an acceptable luminance of the illumination beam directly incident on a human eye under a safety limit is X lumen, then, C %, A and X satisfy an expression as follows:

$$X \leq A \leq X + X \cdot (1 - C\%).$$

As such, both image luminance and the safety for eyes may be achieved simultaneously only if a single light beam is controlled under the regulations of the laser usage.

On the other hand, since the imaging region SI is composed of each of the sub imaging regions SI1 and SI2, an included angle between each of the reflected light beams 61 and 71 should have a threshold so as to avoid a gap between the sub imaging regions SI1 and SI2. To be specific, in the present embodiment, if the rotation angle for the MEMS mirror 120 to rotate with the first direction D1 as the rotation axis is θ, an included angle γ between each of the reflected light beams 61 and 71 should be smaller than or equal to 2θ. Moreover, in order to avoid a permanent damage on the retina due to the two laser beams incident into a pupil simultaneously, the included angle between each of the reflected light beams 61 and 71 should be greater than or equal to 0.0018°. When the included angle γ is greater than or equal to 0.0018°, the reflected light beams 61', 71' is incapable of being incident into the pupil at the same time. Accordingly, given that the illumination beam 60 and the illumination beam 70 have the same output power, it should be sufficient in the present embodiment that the output power of the illumination beam 60 and the illumination beam 70 would not cause a permanent damage on the retina. Based on the above description, the angle θ for the rotations and the included angle γ have to satisfy an expression as follows:

$$0.0018° \leq \gamma \leq 2\theta$$

In the present embodiment, θ is between 5° and 30°. However, it should be noticed that the angle parameter set forth above is merely an example for description and is not intent to construct limitations to the present invention.

It is to be noticed that in the projection apparatus 100, the example where two illumination beams, i.e., 60 and 70, having different transmission paths are outputted is illustrated. However, the present invention is not intent to limit the number of the illumination beams to be used. In other words, in other alternative embodiments, the number of the illumination beams may be three or more. The imaging region SI formed by different numbers of illumination beams will be described with reference to FIG. 6A through FIG. 6C hereinafter.

Figure 6A:
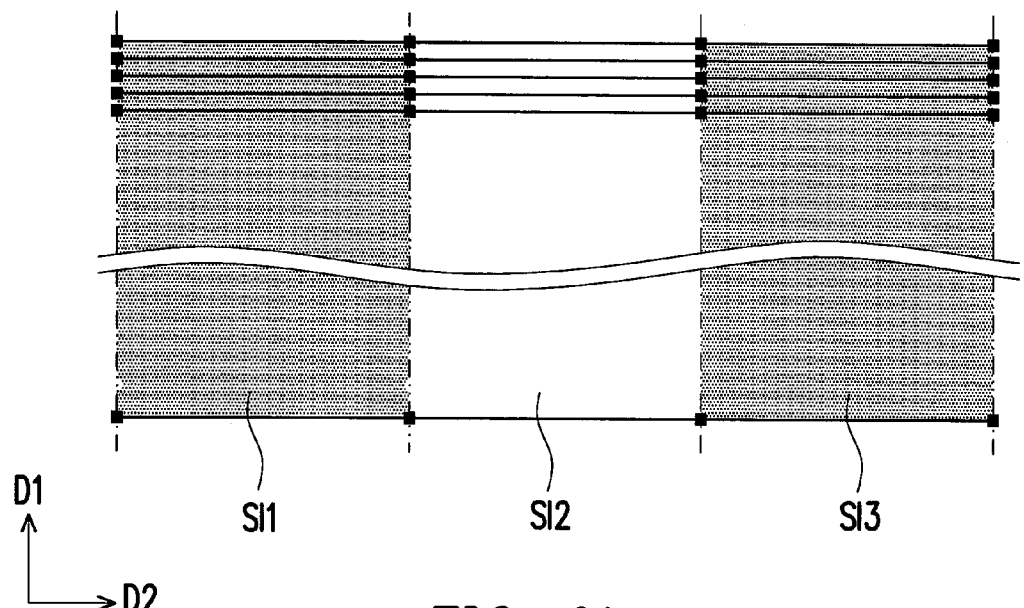
FIG. 6A schematically illustrates a front view of an imaging region according to another embodiment of the present invention.
Figure 6B:
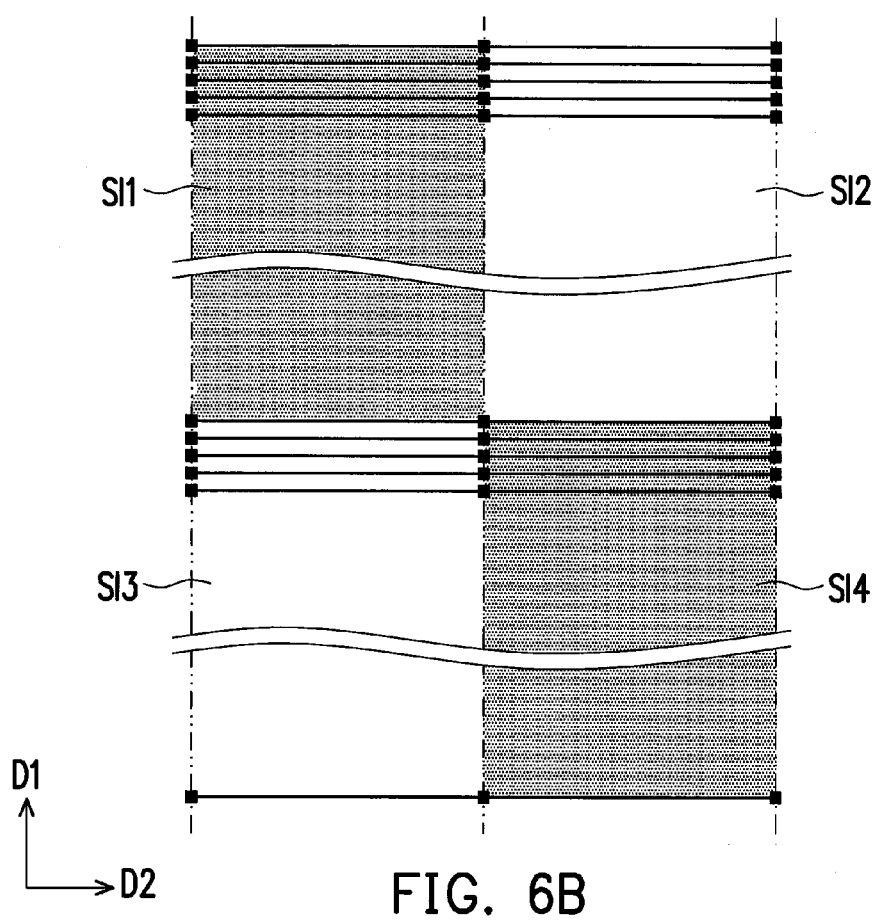
FIG. 6B schematically illustrates a front view of an imaging region according to still another embodiment of the present invention.
Figure 6C:
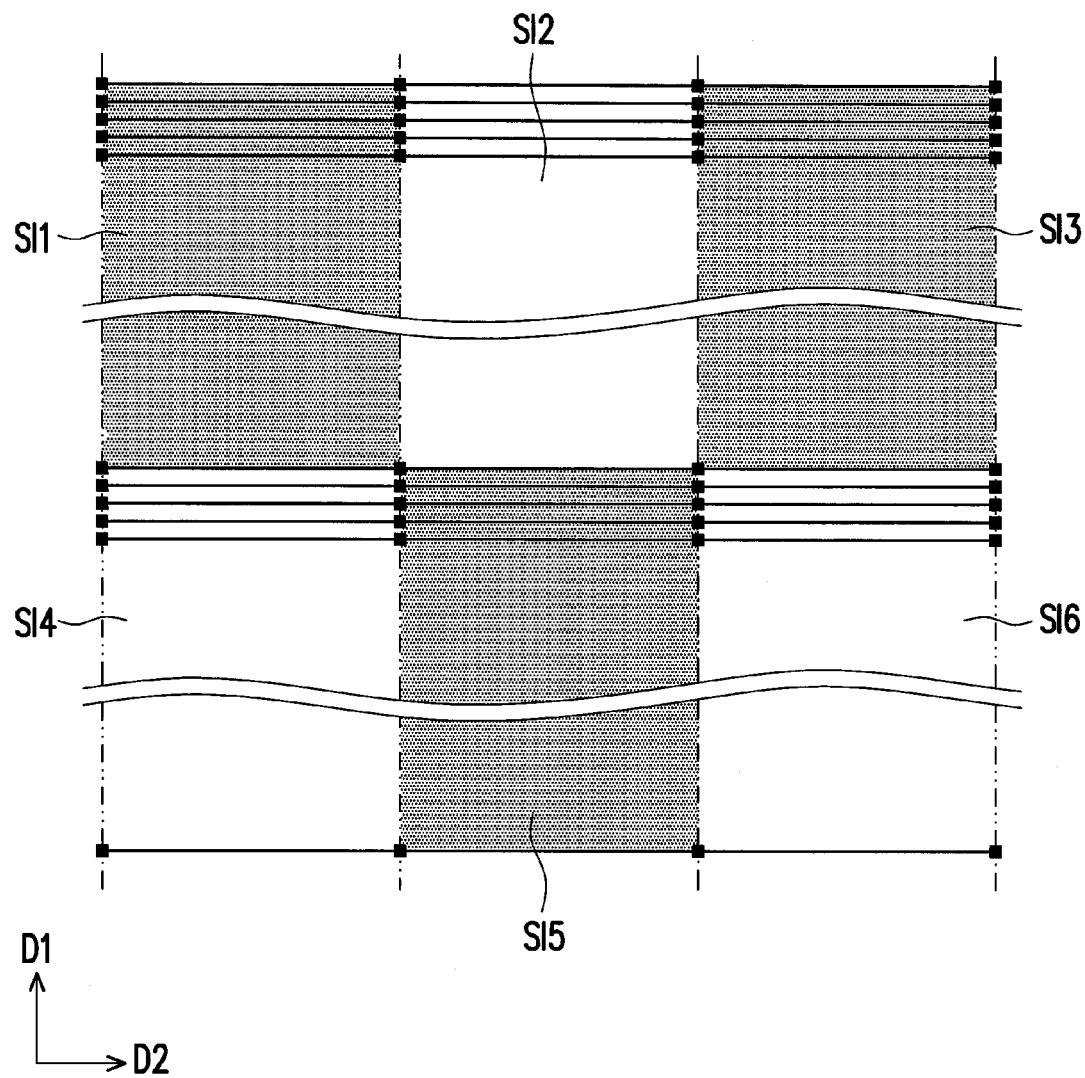
FIG. 6C schematically illustrates a front view of an imaging region according to yet another embodiment of the present invention.

FIG. 6A through FIG. 6C schematically illustrate front views of an imaging region according to different embodiments. Referring to FIG. 6A, when the number of illumination beams to be used is 3, sub imaging regions SI1, SI2 and SI3 may be arranged in a row along the second direction D2 within an imaging region SI. Referring to FIG. 6B, when the number of the illumination beams to be used is 4, sub imaging regions SI1, SI2, SI3 and SI4 may be arranged in a (2×2) array within the imaging region SI. Referring to FIG. 6C, when the number of the illumination beams to be used is 6, sub imaging regions SI1, SI2, SI3, SI4, SI5 and SI6 may be arranged in a (2×3) array within the imaging region SI. Accordingly, in the theses embodiments, the imaging region SI may be divided into a plurality of sub imaging regions, and the sub imaging regions may be arranged in a (m×n) array.

In the embodiments illustrated in FIG. 6A through FIG. 6C, an image is projected on each of the sub imaging regions in a manner similar to the embodiment illustrated in FIG. 1, and will not be repeated herein.

Based on the above description, the present invention utilizes a plurality of illumination beams operated with a single MEMS mirror. Users can view a complete image that is constituted by a plurality of parts, and each part of the complete image is respectively provided through the scanning of one of the illumination beams incident to the MEMS mirror. In addition, in the projection apparatus of the present invention, a plurality of illumination beams is utilized, and thus, the rotation angle and the rotation frequency of the MEMS mirror may be dramatically reduced. As a result, the size of the MEMS mirror is no longer limited by the rotation angle and the rotation frequency, which facilitates in production cost down.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A projection apparatus, comprising:
a light source module, outputting a plurality of illumination beams having different transmission paths; and
a micro-electro-mechanical-system (MEMS) mirror, disposed on the transmission paths of the illumination beams, wherein each of the illumination beams propagates to the MEMS mirror and is reflected by the MEMS mirror to project on a plurality of positions within an imaging region, wherein the transmission paths of the plurality of illumination beams transmitted from the light source module to the MEMS mirror are not intersected with the imaging region,
wherein the imaging region is divided into a plurality of sub imaging regions arranged in an array, each of the illumination beams propagates to the MEMS mirror and is reflected by the MEMS mirror to one of the sub imaging regions to project a display dot,
wherein each of the display dots located in different positions forms an overlapping projection region, a ratio of an area of the overlapping projection region to an area of the imaging region is C %, an image luminance of the imaging region is A lumen, an acceptable luminance of the illumination beam directly incident on a human eye under a safety limit is X lumen, and C %, A and X satisfy an expression of:

$X \leq A \leq X + X \cdot (1-C\%)$.

2. The projection apparatus according to claim 1, wherein the light source module outputs two illumination beams having different transmission paths.

3. The projection apparatus according to claim 1, wherein the light source module comprises:
a plurality of coherence light sources, providing a plurality of light beams; and
a plurality of optical elements, wherein each of the optical elements is disposed on a transmission path of one of the light beams.

4. The projection apparatus according to claim 3, wherein each of the coherence light sources comprises a laser diode.

5. The projection apparatus according to claim 3, wherein the optical elements comprise lenses and/or reflectors.

6. The projection apparatus according to claim 1, wherein the MEMS mirror performs two-dimensional rotations with a first direction and a second direction as rotation axes.

7. The projection apparatus according to claim 6, wherein the first direction is substantially perpendicular to the second direction.

8. A projection apparatus, comprising:
a light source module, outputting a plurality of illumination beams having different transmission paths; and
a micro-electro-mechanical-system (MEMS) mirror, disposed on the transmission paths of the illumination beams, wherein each of the illumination beams propagates to the MEMS mirror and is reflected by the MEMS mirror to project on a plurality of positions within an imaging region, wherein the transmission paths of the plurality of illumination beams transmitted from the light source module to the MEMS mirror are not intersected with the imaging region,
wherein the imaging region is divided into a plurality of sub imaging regions arranged in an array, each of the illumination beams propagates to the MEMS mirror and is reflected by the MEMS mirror to one of the sub imaging regions to project a display dot,
wherein an angle for the MEMS mirror to perform the rotation with the first direction as the rotation axis is θ, an included angle between each of the illumination beams reflected by the MEMS mirror is γ, and θ and γ satisfy an expression of:

$0.0018° \leq \gamma \leq 2\theta$.

9. The projection apparatus according to claim 8, wherein θ is between 5° and 30°.

* * * * *